United States Patent
James (10) Patent No.: US 9,447,749 B2
(45) Date of Patent: Sep. 20, 2016

(54) PIVOTING BLOCKER DOOR FOR THRUST REVERSER

(71) Applicant: Rohr, Inc., Chula Vista, CA (US)

(72) Inventor: Norman John James, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 697 days.

(21) Appl. No.: 13/855,214

(22) Filed: Apr. 2, 2013

(65) Prior Publication Data

US 2015/0204272 A1    Jul. 23, 2015

(51) Int. Cl.
*F02K 1/72*    (2006.01)

(52) U.S. Cl.
CPC ...................... *F02K 1/72* (2013.01)

(58) Field of Classification Search
CPC .......................................... F02K 1/72
USPC .............. 60/226.2, 230; 239/265.19, 265.31; 244/110 B
See application file for complete search history.

(56) References Cited

U.S. PATENT DOCUMENTS

| | | | | |
|---|---|---|---|---|
| 3,280,562 A * | 10/1966 | Theits | ....................... | F02K 1/72 60/230 |
| 4,410,152 A * | 10/1983 | Kennedy | .................... | F02K 1/72 60/226.2 |
| 4,801,112 A * | 1/1989 | Fournier | ................... | F02K 1/72 60/226.2 |
| 5,054,285 A * | 10/1991 | Geidel | ....................... | F02K 1/72 60/226.2 |
| 5,228,641 A * | 7/1993 | Remlaoui | .................. | F02K 1/72 60/226.2 |
| 5,863,014 A * | 1/1999 | Standish | ................... | F02K 1/70 60/226.2 |
| 5,927,647 A | 7/1999 | Masters et al. | | |
| 6,968,675 B2 | 11/2005 | Ramlaoui et al. | | |
| 2007/0007388 A1 * | 1/2007 | Harrison | .................... | F02K 1/72 244/110 B |
| 2010/0139242 A1 * | 6/2010 | Vauchel | .................... | F02K 1/72 60/226.2 |
| 2010/0229527 A1 | 9/2010 | Amkraut et al. | | |
| 2011/0296813 A1 | 12/2011 | Frank et al. | | |
| 2014/0027537 A1 * | 1/2014 | Binks | ....................... | F02K 1/72 239/265.35 |

* cited by examiner

*Primary Examiner* — Ted Kim
(74) *Attorney, Agent, or Firm* — Kinney & Lange, P.A.

(57) ABSTRACT

A thrust reverser includes a translating sleeve and a blocking door assembly that includes two, three, or four blocker door segments. The translating sleeve is movable axially with respect to a fan case and a core cowl between a cruise position and a thrust reversal position. The blocker door segments are positioned adjacent an inner wall of the translating sleeve in the cruise position, and are pivotable to a position in which the blocker door segments substantially block the bypass duct in the thrust reversal position. Each blocker door segment is connected to the translating sleeve at transverse ends by a pair of support bearings that establish a pivot axis along an arc chord of the blocker door segment.

5 Claims, 13 Drawing Sheets

PIVOTING BLOCKER DOOR FOR THRUST REVERSER

BACKGROUND

This invention relates to gas turbine engines used to provide thrust for aircraft. In particular, the present invention relates to thrust reversers used with turbofan gas turbine engines.

Typical aircraft turbofan engines include a fan that draws and directs a flow of air into a nacelle and into and around an engine core. The nacelle surrounds the engine core and helps promote the laminar flow of air around the core. The flow of air that is directed into the engine core is initially passed through a compressor that increases the air flow pressure, and then through a combustor where the air is mixed with fuel and ignited. The combustion of the fuel and air mixture produces a flow of exhaust gas that causes a series of turbine blades at the rear of the engine core to rotate, and to drive the engine's rotor and fan. The high-pressure exhaust gases from the combustion of the fuel and air mixture are thereafter directed out of the engine through an exhaust nozzle at the rear of the engine.

Bypass flow is air that is directed around the engine core. In turbofan engines, the bypass flow typically provides the main thrust for an aircraft. The bypass flow also can be used to help slow a landed aircraft. Thrust reversers mounted in the nacelle structure selectively reverse the direction of the bypass flow to generate reverse thrust. During normal engine operation, the bypass flow may or may not be mixed with the engine core exhaust before exiting the engine assembly.

Thrust reverser systems are used in aircraft engines to slow the velocity of the aircraft during a landing. Typical thrust reverser systems include blocking devices that are fashioned to articulate from an outer duct wall of a bypass duct. The blocking devices need to be positioned when the aircraft is in flight so that normal bypass flow to the final exit of the engine is not impeded. During thrust reversal, blocking devices change position to block flow through the bypass duct and direct the bypass airflow through an opening in the outer wall of the duct to produce reverse thrust. The blocking devices move from one position to another as a result of a movement of a translating sleeve which moves in an aft direction to open a passage for reverse thrust airflow during a thrust reversal. Reduction of aero drag in a bypass duct is a major target for improving engine fuel burn efficiency. One candidate for reduction of aero drag is elimination or reduction of drag links that are used to move the blocking elements of a thrust reverser. These drag links radially cut and split the bypass flow and produce turbulence in the bypass duct. The problem is that drag links have proven to be very effective for passively and synchronously deploying blocker elements as a result of imparted translating sleeve motion.

Another type of thrust reverser makes use of a pivot door reverser, which replaces the translating sleeve with pivot doors which flip open to create an exit passage through both the outer duct wall and the nacelle outer barrel. This eliminates any translating elements. The pivot door reverser dumps bypass air outward and forward to achieve the reverser flow vectors. The forward portion of the pivot door is configured to seal the outer duct during cruise operation. The aft portion of the pivot door is shaped to achieve a close fit with the core cowl when the pivot door is deployed to its full pivoted thrust reversal position to block through flow of bypass air. The required seals for the pivot door reverser tend to be problematic, and the pivot door requires that there be an opening in the outer barrel of the nacelle so that the forward part of the pivot door can extend outward of the outer barrel during thrust reversal.

SUMMARY

A thrust reverser includes a translating sleeve, and a set of two, three, or four blocker door segments that are pivotally mounted to the translating sleeve. The blocker door segments are positioned adjacent an inner wall of the translating sleeve when the translating sleeve is in a cruise position, and are pivotable to a position in which the blocker door segments substantially block bypass airflow when the translating sleeve is in a thrust reversal position. Each blocker door segment is pivotally connected to the translating sleeve at transverse ends by support bearings that establish a pivot axis along an arc chord of the blocker door segment.

In another embodiment, a thrust reverser includes a bypass duct defined by a core cowl, a fan case, and a translating sleeve, and a plurality of blocker door segments that are pivotally mounted to the translating sleeve. The blocker door segments are positioned adjacent an inner wall of the translating sleeve when the translating sleeve is in a cruise position, and are pivotable to a position in which the blocker door segments substantially block the bypass duct when the translating sleeve is in a thrust reversal position.

DETAILED DESCRIPTION

Figure 1A:
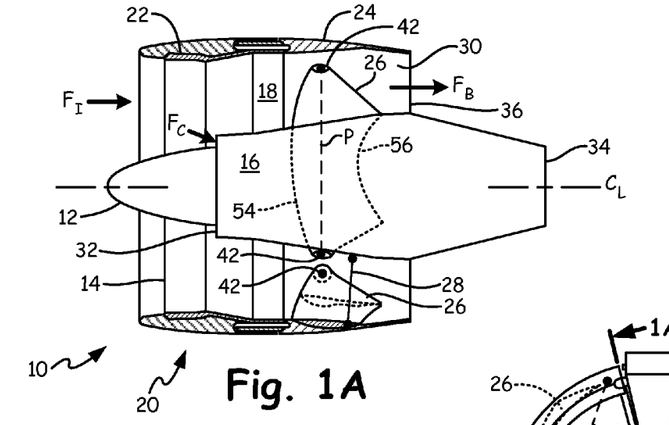
FIGS. 1A-1C illustrate a three segment pivoting blocker door thrust reverser in a cruise position.
Figure 1B:
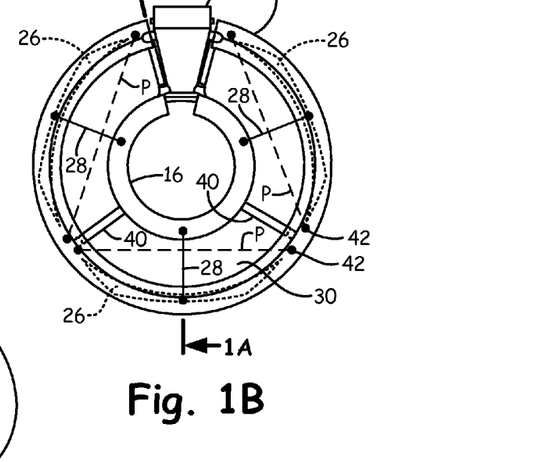
Figure 1C:
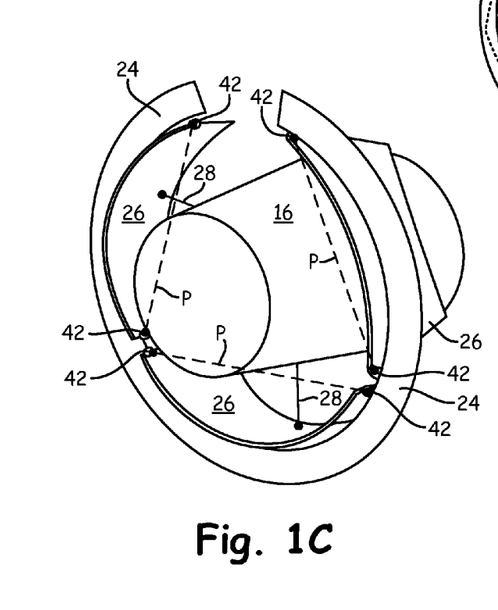
Figures 2A, 2B, 2C:
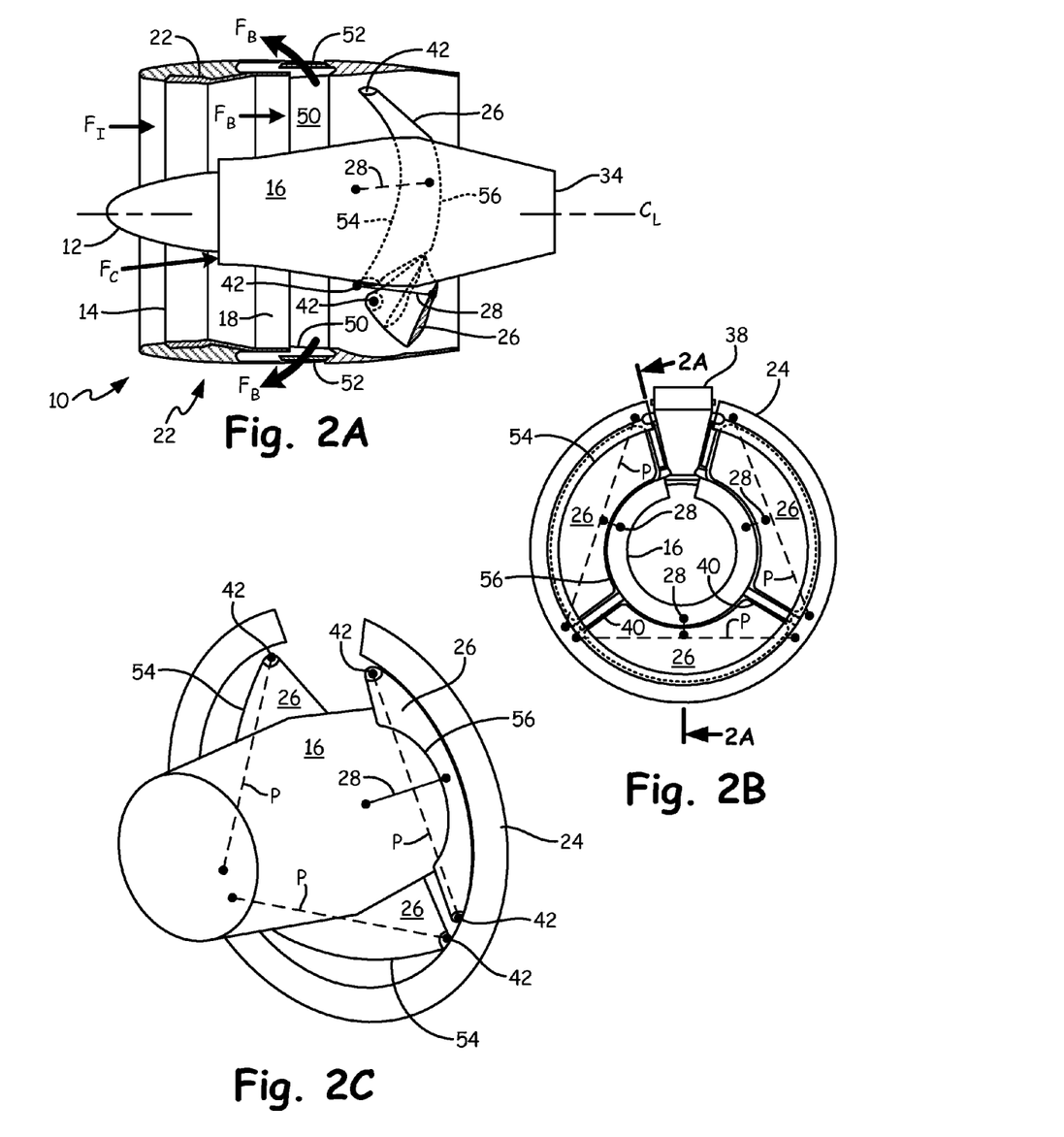
FIGS. 2A-2C illustrate the three segment pivoting blocker door thrust reverser in a thrust reversal position.

FIGS. 1A-1C and 2A-2C illustrate turbofan engine 10, which features a pivoting blocker door thrust reverser with three pivoting blocker doors. FIGS. 1A-1C show engine 10 with the pivoting blocker door thrust reverser in cruise position, while FIGS. 2A-2C show engine 10 with the pivoting blocker door thrust reverser in thrust reversal position.

FIG. 1A is a partial sectional view of engine 10 taken along section 1A-1A of FIG. 1B. Engine 10 includes nose cone 12, fan 14, core cowl 16, structural guide vanes 18, and nacelle 20, which includes fan case 22 and translating sleeve 24. Pivotally mounted to translating sleeve 24 are three blocker door segments 26. In this embodiment, drag links 28 are connected between blocker door segments 26 and core cowl 16. As shown in FIG. 1A, blocker door segments 26 are shown in a cruise position, in which segments 26 are stowed flush with the inner wall of translating sleeve 24.

Nacelle 20 and core cowl 16 are coaxially aligned to define bypass duct between the outer wall of core cowl 16 and the inner wall of nacelle 20. Located within core cowl 16 is the engine core, which includes the compressor, combustor, and turbine sections of turbofan engine 10. Fan 14 draws incoming airflow $F_I$ into nacelle 20. Core airflow portion $F_C$ of incoming airflow $F_I$ enters core cowl 16 at upstream inlet 32. Core airflow $F_C$ is initially passed through the compressor section, which increases the pressure of airflow $F_C$. Core airflow $F_C$ is then directed into the combustor section, where it is mixed with fuel and ignited. The combustion products produced by combustion of fuel and air flow into the turbine section and cause the turbine blades to rotate. One or more shafts connect portions of the turbine section to portions of the compressor section and to fan 14, so that rotation of the turbine blades causes rotation of the compressor blades and fan 14. The combustion products pass from the turbine section and exit through exhaust nozzle 34 at the rear of engine 10.

Bypass airflow $F_B$ flows through bypass duct 30. When engine 10 is in cruise operation, bypass airflow $F_B$ exits engine 10 at the rear of nacelle 20. In cruise, bypass flow $F_B$ typically provides the main thrust for an aircraft.

Structural guide beams 18 are positioned between core cowl 16 and fan case 22. Structural guide beams 18 act as radial struts to support static and dynamic loads during engine operation, and also function as guide vanes to de-swirl bypass airflow $F_B$ as it flows toward bypass duct outlet 36.

FIG. 1B shows a front view of translating sleeve 24 and core cowl 16. FIG. 1B illustrates a pylon mounted installation, in which nacelle 20 is mounted on pylon 38. With this configuration, the outer duct wall formed by fan case 22 and translating sleeve 24 is in the form of one almost 360° segment. In other words, fan duct 22 is a single O-duct configuration, i.e., with no split at the bottom. This allows for an odd number of blocking door segments such as the three segment configuration shown in FIGS. 1A-1C.

As shown in FIG. 1B, core cowl 16 is connected by struts 40 to nacelle 20. In the stowed cruise position shown in FIG. 1B, each of the three door segments 26 is stowed in a recess or pocket of translating sleeve 24 so that the inward facing surface of each door segment 26 is flush with the inner surface of translating sleeve 24.

Each door segment 26 is pivotally connected to translating sleeve 24 on a pair of bearings 42. Bearings 42 are positioned near opposite transverse ends of each blocker door segment 26, and define pivot axis P along an arc cord of blocker door segment 26.

FIG. 1C is a perspective view showing core cowl 16, a portion of translating sleeve 24, blocker door segments 26, and drag links 28. In FIG. 1C, portions of translating sleeve 24 have been removed to allow better viewing of the location of blocker door segments 26 in their stowed cruise position. In this position, bypass duct 30 is open, so that bypass airflow $F_B$ can pass axially rearward through bypass duct 30 to exit 36.

FIGS. 2A-2C show engine 10 in a thrust reversal state. Translating sleeve 24 has moved rearward with respect to fan case 22 so that thrust reversal outlet 50 is open. This rearward movement is produced by one or more actuators connected to translating sleeve 24. Baffle 52, which in this embodiment is connected to translating sleeve 24, is positioned in outlet 50 to direct bypass air $F_B$ radially outward and forward to produce thrust reversal. In one embodiment, baffle 52 may be a translating cascade, while in another embodiment baffle 52 may be a fixed cascade.

As translating sleeve 24 moves rearward away from fan case 22, drag links 28 cause door segments 26 to pivot rearwardly and inwardly around pivot axis P until rear edge 56 of door segment 26 is adjacent to core cowl 16 and forward edge 54 is adjacent an inner wall of translating sleeve 24. With all three blocker doors 26 pivoted to the thrust reversal position, bypass duct 30 is blocked downstream of thrust reversal outlet 50, which causes bypass airflow $F_B$ to exit bypass duct 30 through baffle 52.

As shown in FIGS. 2A-2C, rear edge 56 of blocker door segments 26 is contoured to conform to the shape of the outer wall of core cowl 16. This minimizes leakage of bypass air past blocker door segments 26 during thrust reversal.

A comparison of FIGS. 1A-1C with FIGS. 2A-2C illustrates how the rearward movement of translating sleeve 24 results in movement of blocker doors 26 from a stored cruise position in which bypass duct 30 is open all the way to exit 36, to a closed thrust reverse position in which bypass duct 30 is blocked by blocker doors 26 and bypass air $F_B$ exits through passage 50 and baffle 52. The pivoting of door segments 26 about a set of pivot bearings 42 establishes pivot axis P along the door chord line. This allows door segments to simply pivot aft for closure and duct blocking. The arc curvature of the door segments 26 assures a parachute like tensile loads under blocking pressure, carrying loads into pivot bearings 42 and translating sleeve 24. These loads are almost symmetrical on door segments 26 and will be almost pressure neutral. This allows torque actuation at the bearings to deploy segments 26 by single drag links or other passive or active devices. If drag links are used, only one drag link is needed to provide actuation and 3-point stabilization (in combination with pivot bearings 42).

Figure 3A:
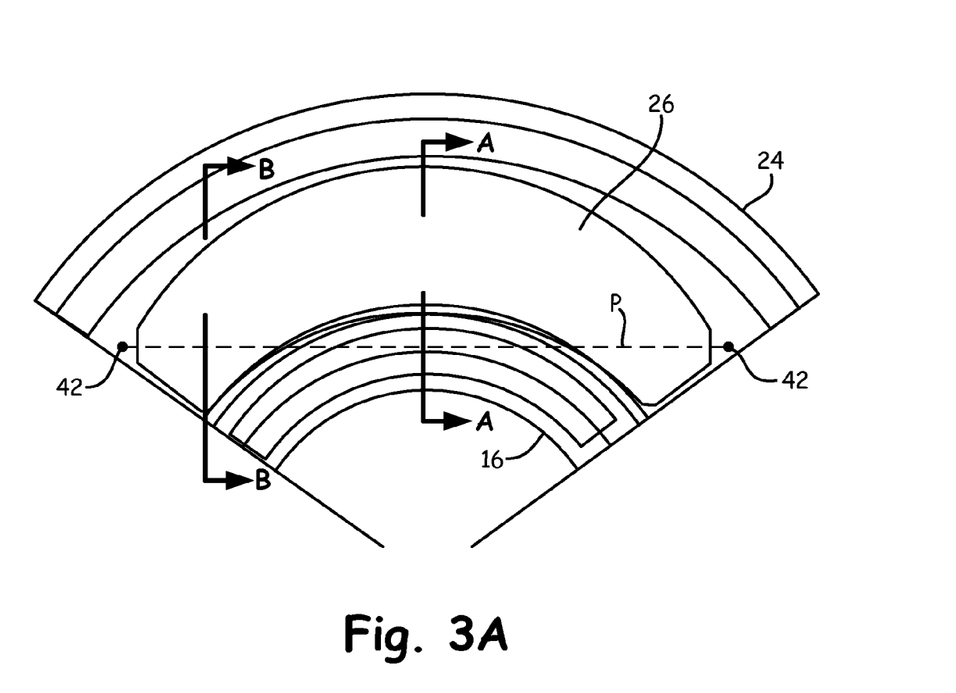
FIG. 3A is a front view of one segment of a three segment aft pivoting blocker door thrust reverser.
Figure 3B:
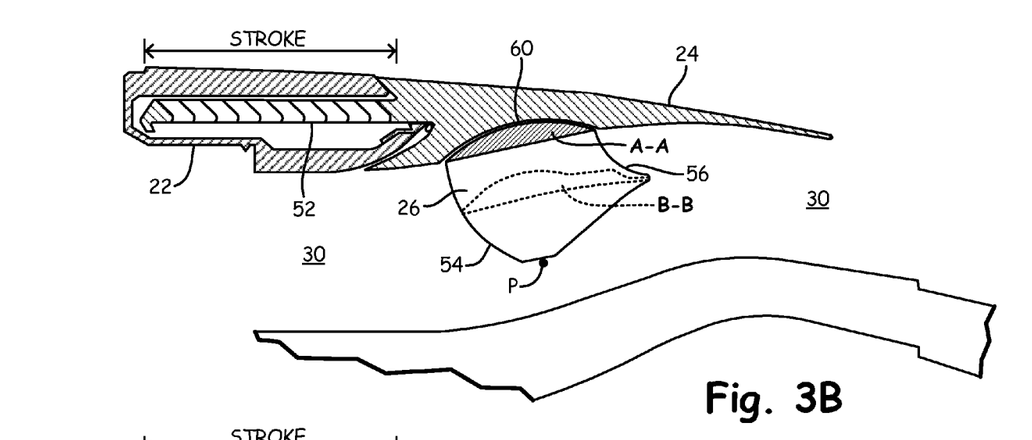
FIGS. 3B and 3C show sectional views of the thrust reverser of FIG. 3A in cruise and thrust reversal positions, respectively.
Figure 3C:
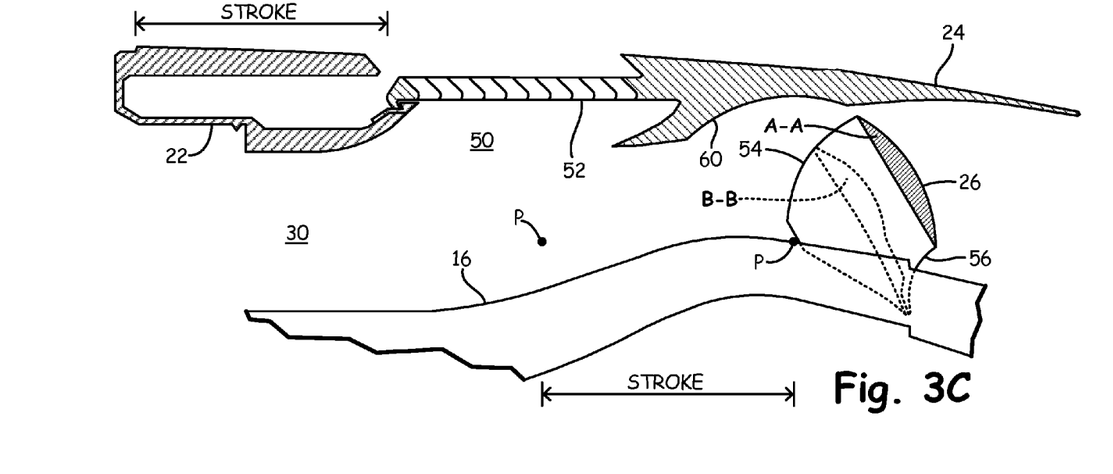

FIGS. 3A, 3B, and 3C, illustrate the movement of aft pivoting blocker door segments 26. FIG. 3A shows blocker door 26 oriented so that segments 26 is centered about a vertical axis. Sections A-A and B-B are shown in FIG. 3A. Section A-A is a section along the central axis of door segment 26. Section B-B is a section that is parallel to section A-A, and extends through one corner of rear edge 54 of segment 26.

FIG. 3B illustrates the cruise position in which a forward end of translating sleeve 24 is adjacent a rear end of fan case 22. In this position, the outer surface of segment 26 mates with pocket 60 of translating sleeve 24, so that the inner surface of segment 26 presents a smooth continuous surface with the inner surface of translating sleeve 24. FIG. 3B sections A-A and B-B are superimposed on a section of segment 26.

In FIG. 3C, translating sleeve 24 is moved aft to open outlet 50 and position baffle 52 for redirecting bypass air out of bypass duct 30 to produce thrust reversal. The stroke of translating sleeve 24 from the cruise position shown in FIG. 3B to the thrust reversal position in FIG. 3C is shown. The stroke results in an axial translation of pivot axis P rearward to the position shown in FIG. 3C. Blocker door segment 26 is pivoted rearwardly and inwardly so that rear edge 56 is adjacent core cowl 16. As in FIG. 3B, sections A-A and B-B are shown in FIG. 3C.

Figure 4A:
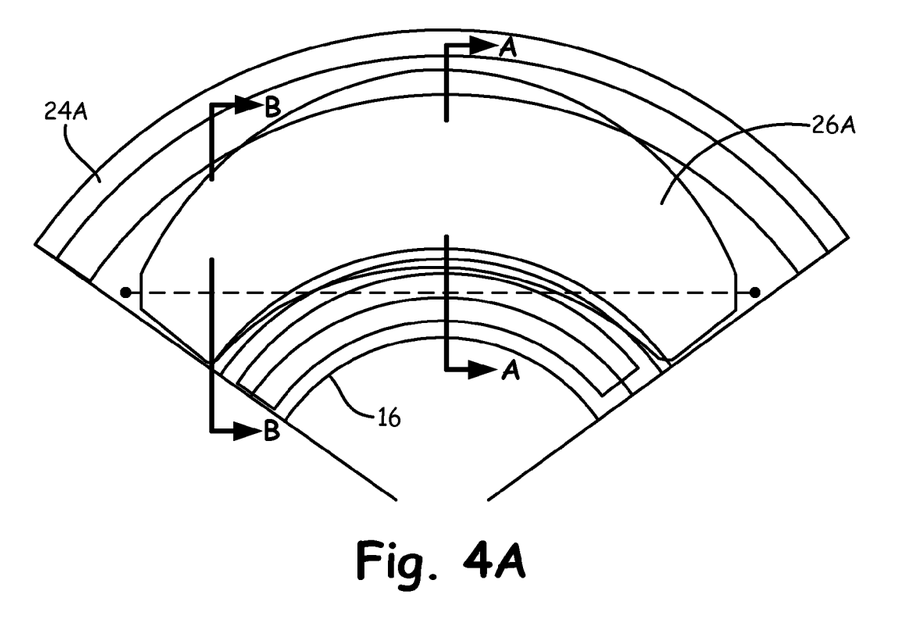
FIG. 4A is a front view of one segment of a three segment forward pivoting blocker door thrust reverser.
Figure 4B:
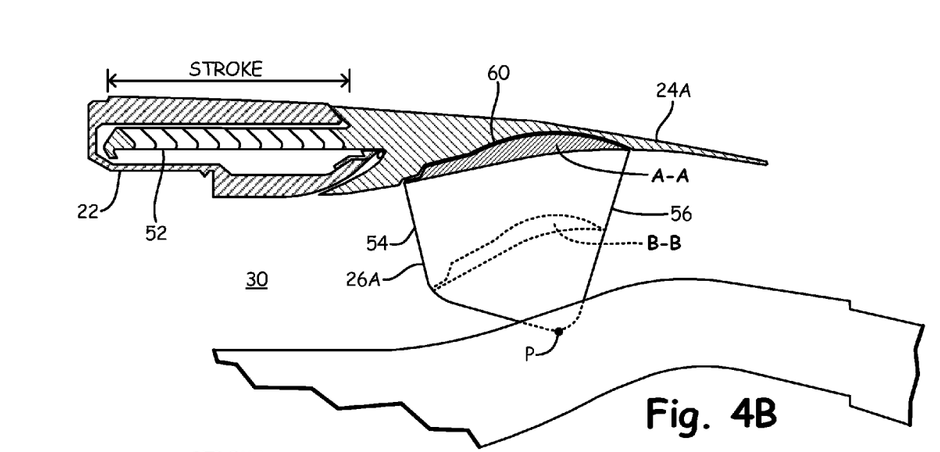
FIGS. 4B and 4C show sectional views of the thrust reverser of FIG. 4A in cruise and thrust reverser positions, respectively.
Figure 4C:
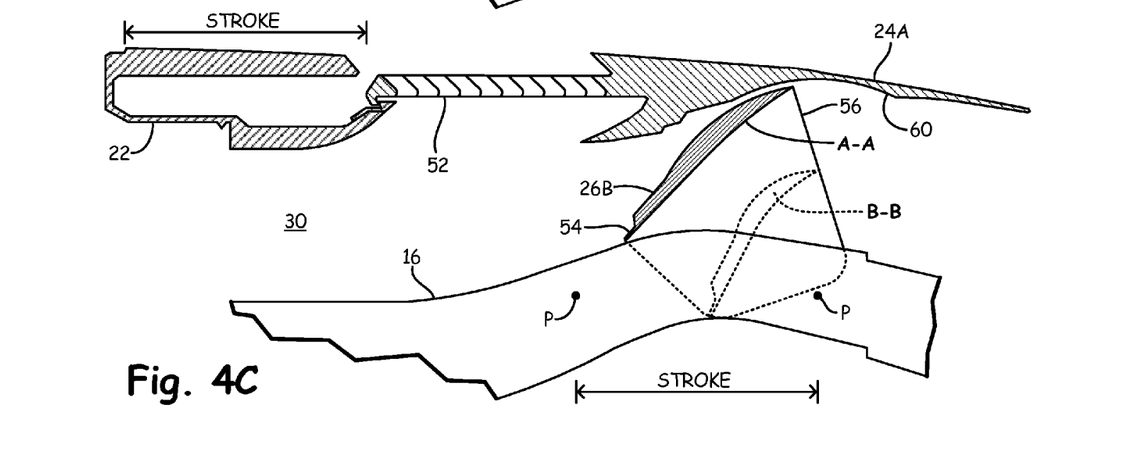

An alternative three blocker door segment embodiment is illustrated in FIGS. 4A-4C. In this embodiment, rearward movement of translating sleeve 24A results in a forward and inward pivoting of blocker door segment 26A.

FIG. 4A illustrates blocker door segment 26A, and shows the location of sections A-A and B-B. The sections are superimposed on the drawings of segment 26A in FIGS. 4B and 4C.

FIG. 4B illustrates the cruise position of forward pivoting blocker door segment 26A. FIG. 4C shows the position of forward pivoting blocker door segment 26A when translating sleeve 24A is moved rearwardly by the stroke distance. Door segments 26A may include extended portions of the duct wall beyond the swing radius in order to approach the close proximity needed to provide the desired thrust reversal.

Figure 5A:
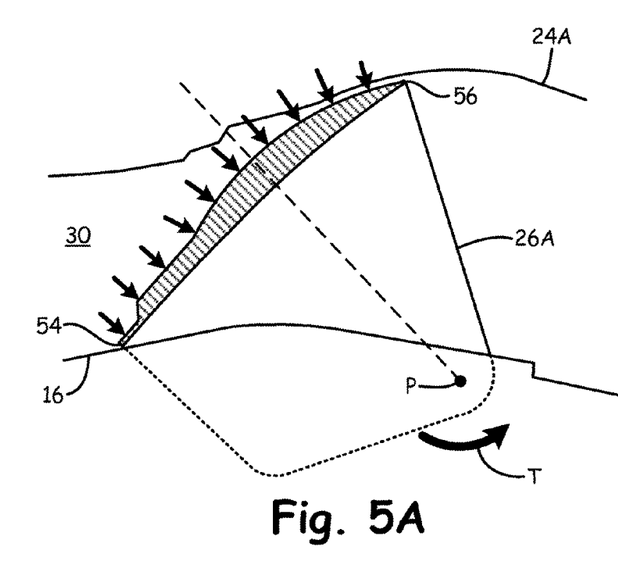
FIGS. 5A and 5B illustrate loads on a forward pivoting blocker door and an aft pivoting blocker door, respectively.
Figure 5B:
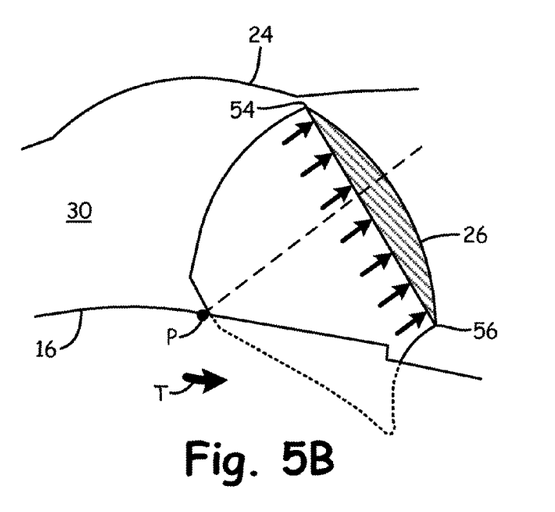

FIG. 5A and 5B provide a comparison of forward pivoting blocker door segment 26A (of FIGS. 4A-4C) in aft pivoting blocker door segment 26 (of FIGS. 1A-3C). As shown in FIG. 5A, forward pivoting blocker door segment 26A results in a natural closing effect, or net closing bias. As forward pivoting door segment 26A begins to close, pressure of bypass airflow $F_B$ assists to move segment 26A toward the closed (thrust reversal) position due to the prevailing torque T. This results in faster deployment to the closed position. One detrimental aspect resulting from this natural closing effect can occur in the event of a rejected landing. In that case, the landing needs to be aborted and translating sleeve 24A must be moved forward to the cruise position. Forward pivoting blocker door 26A must pivot back to its cruise position. The force of bypass air against closed blocker door segment 26A will resist the return of segment 26A to the open cruise position.

In general, forward pivoting blocker door segment 26A illustrated in FIG. 5A is larger than aft pivoting blocker door as illustrated in FIG. 5B. This is because the portion of bypass duct 24 that segment 26A closes is larger than the portion further downstream that segment 26 closes.

Blocker door segment 26 in FIG. 5B produces near neutral aero-torque loads. This allows segment 26 to be actuated by shaft devices or a drag link. Aft pivoting blocker door segment 26 is also easier to reopen in the event of a rejected landing because the pressure of bypass airflow $F_B$ tends to open rather than close segment 26 due to the prevailing torque T. This same effect is also present during cruise while it also protects against inadvertent deploy of the thrust reverser of the thrust reverser doors.

Figure 6:
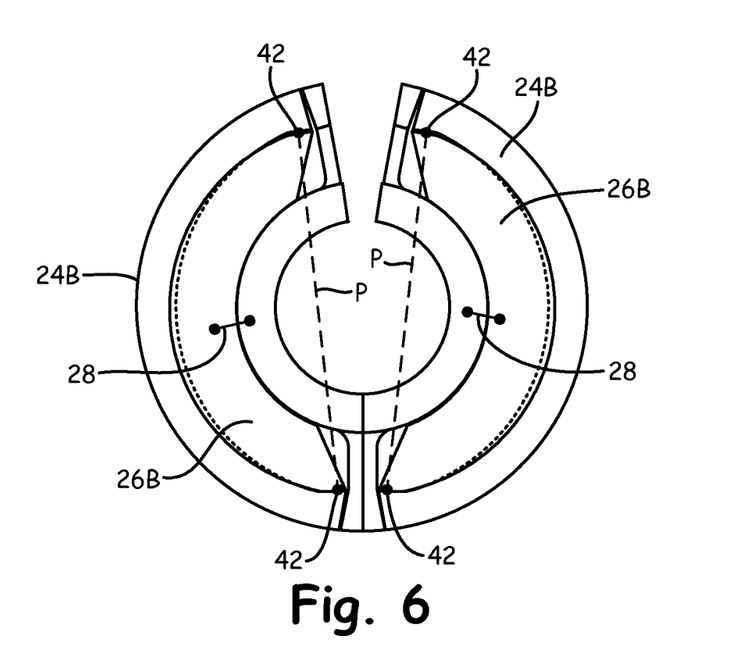
FIG. 6 is a front view of a two segment pivoting blocker door that thrust reverser.

The three door thrust reverser is well suited to an O-duct configuration and a pylon mounted thrust reverser. The pivoting blocker door thrust reverser can also be applied to D-duct applications. FIG. 6 shows a two door embodiment for a classic D-duct configuration. The embodiment shown in FIG. 6, two blocker door segments 26B can be actuated by optional drag links 28.

Figure 7A:
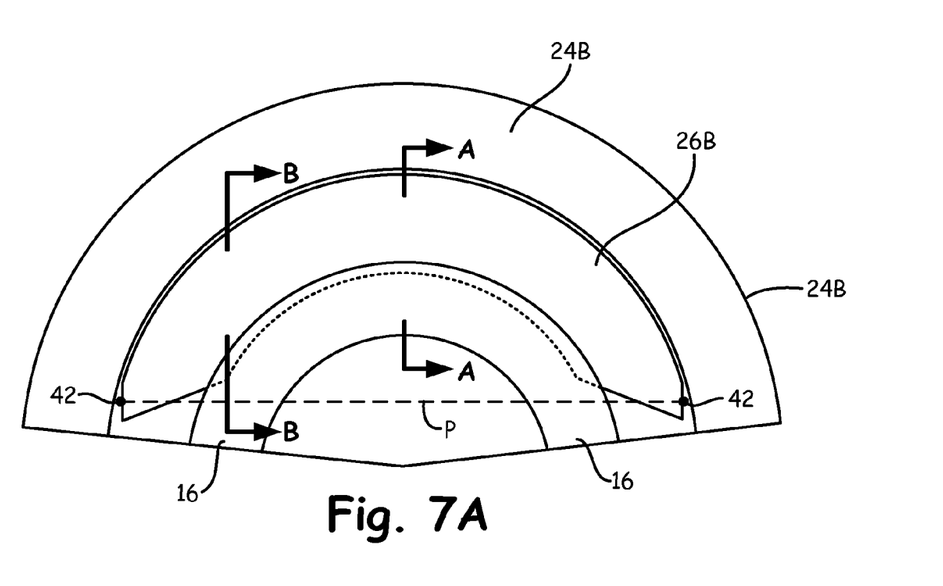
FIG. 7A is a front view of one segment of a two segment aft pivoting blocker door thrust reverser.
Figure 7B:
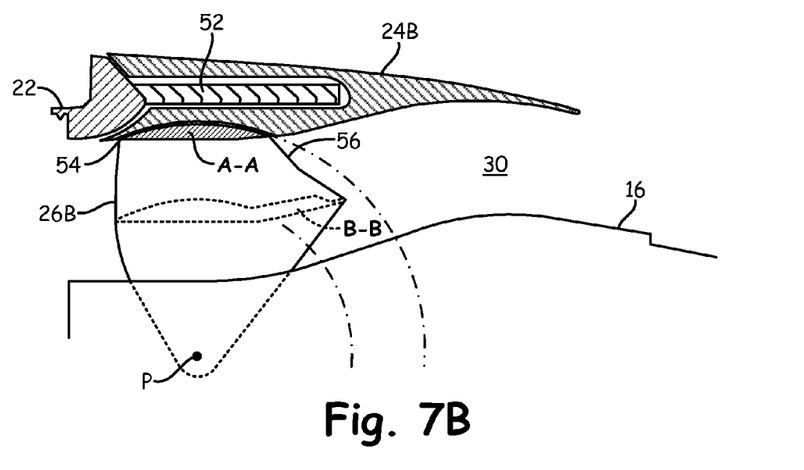
FIGS. 7B and 7C show sectional views of the thrust reverser of FIG. 7A in cruise and thrust reverser positions, respectively.
Figure 7C:
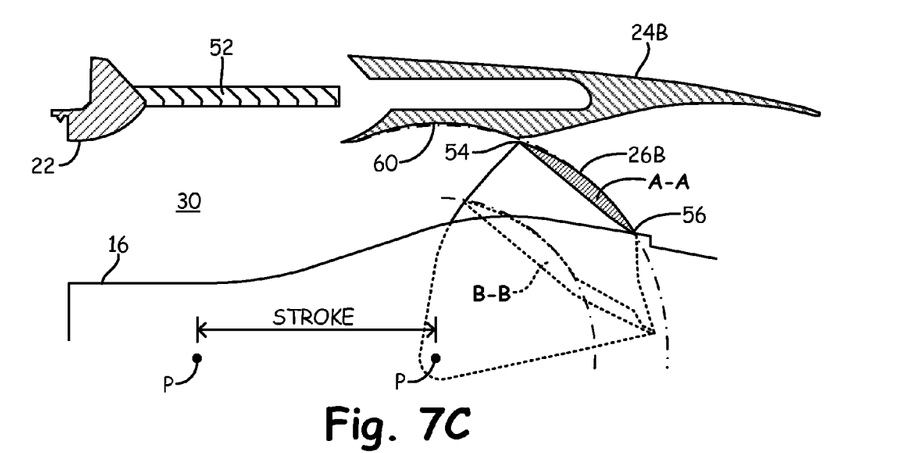

FIGS. 7A-7C illustrate the operation of blocker door 26B in a two door D-duct thrust reversal. FIG. 7A is similar to FIG. 3A and 4A in showing the location of sections A-A and B-B. FIG. 7B shows door segment 26B in the cruise position. Sections A-A and B-B are superimposed on blocker door segment 26B.

FIG. 7C shows the position of blocker door segment 26B after translating sleeve 24B has moved aft from the cruise position to the thrust reversal position. The stroke or axial radial movement of translating sleeve 24B and of pivot axis P is shown in FIG. 7C.

The two door thrust reverser can also be configured in a forward pivot arrangement similar to FIGS. 4A-4C.

Figure 8:
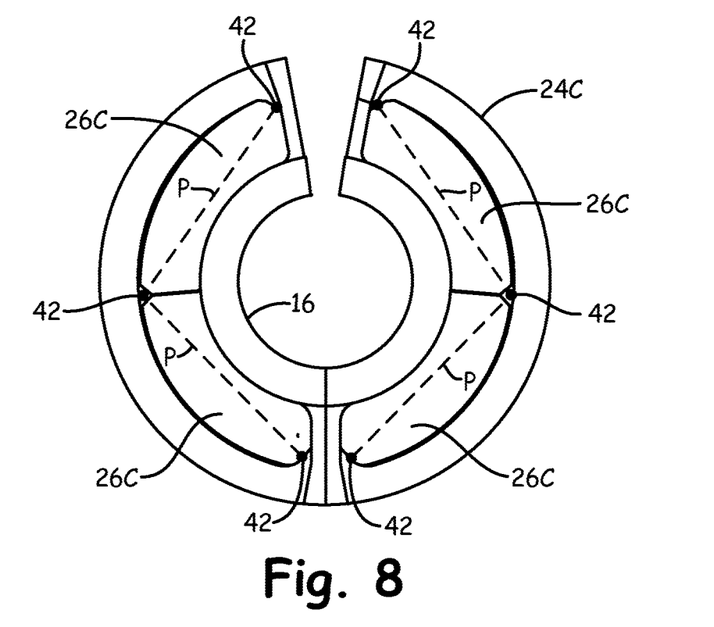
FIG. 8 is a front view of a four segment pivoting blocker door thrust reverser.

FIG. 8 is a four door embodiment for use in a D-duct installation. Blocker door segment 26C is shown in FIG. 8. Each door segment 26C is pivoted about pivot axis P, which extends the full transverse chord of segment 26C.

Figure 9A:
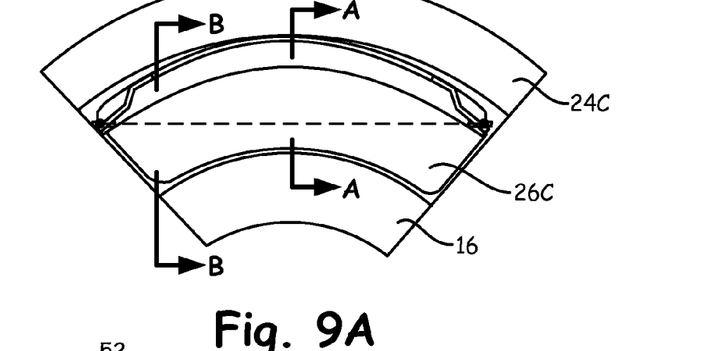
FIG. 9A is a front view of one segment of a four segment aft pivoting blocker door thrust reverser.
Figure 9B:
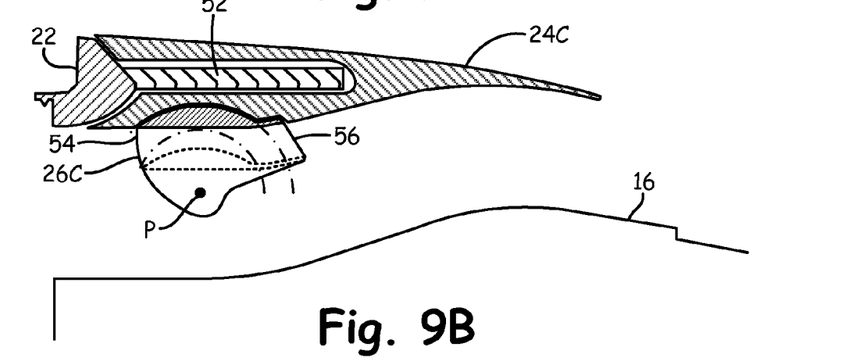
FIGS. 9B and 9C show sectional views of the thrust reverser of FIG. 9A in cruise and thrust reversal positions, respectively.
Figure 9C:
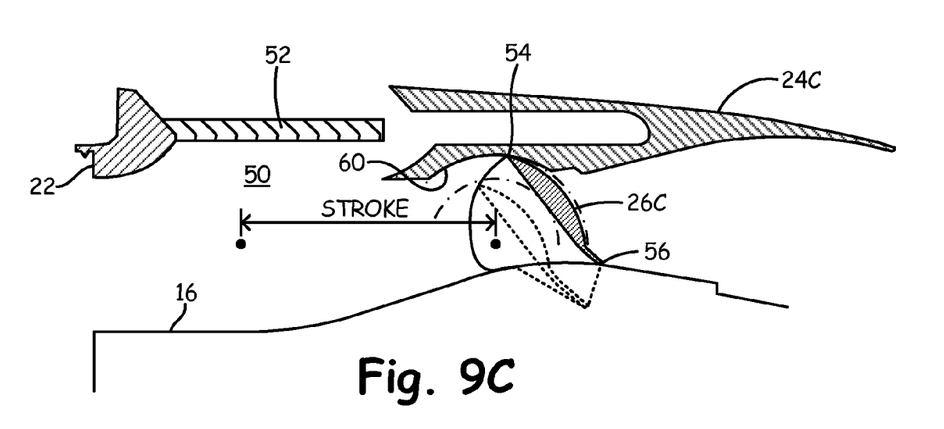

FIGS. 9A-9C illustrate aft translating four door D-duct thrust position. FIG. 9A is similar to FIGS. 3A, 4A, 7A is showing an orientation of one door segment and the location of sections A-A and B-B.

FIG. 9B shows translating sleeve 24C and also door segment 26C in the cruise position. FIG. 9C shows sleeve 24C and door segment 26C in the thrust reverser position.

Figure 10A:
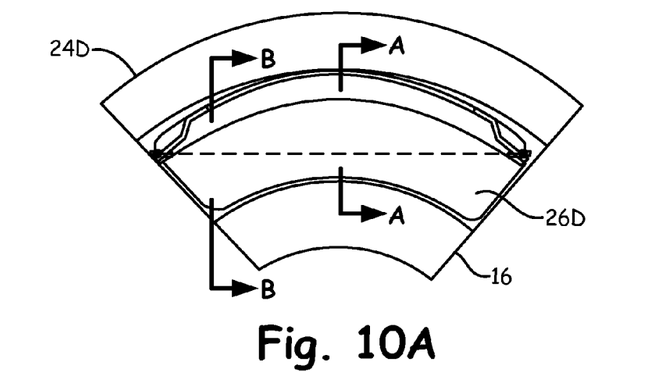
FIG. 10A is a front view of one segment of a four segment forward pivoting blocker door thrust reverser.
Figure 10B:
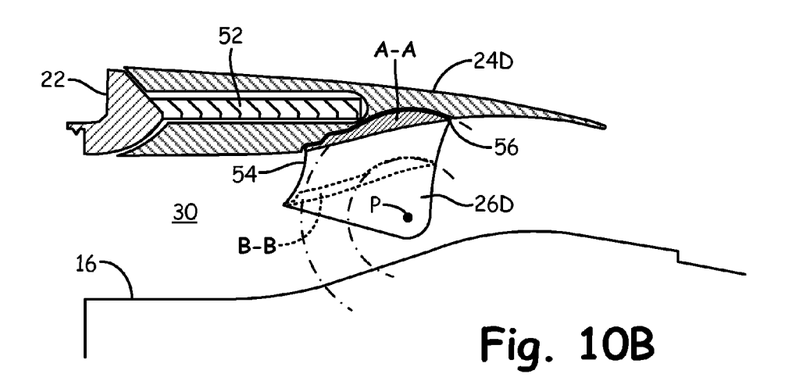
FIGS. 10B and 10C show sectional views of the thrust reverser of FIG. 10A in cruise and thrust reversal positions, respectively.
Figure 10C:
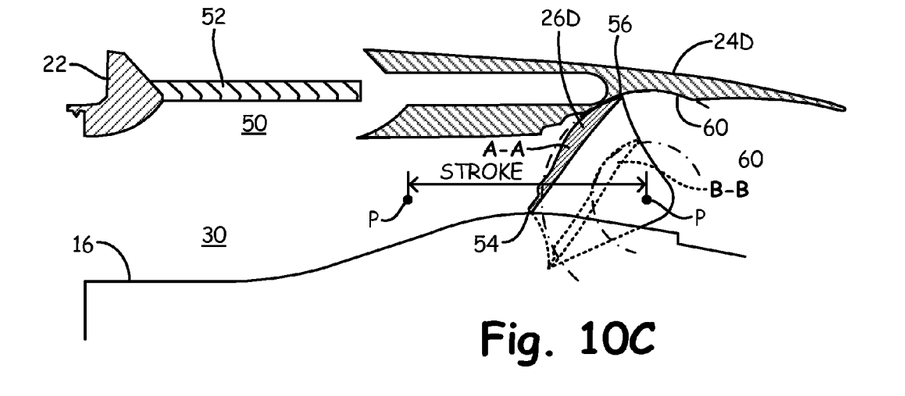

FIG. 10A-10C illustrates another four door D-duct thrust reverser embodiment. In this embodiment, however, door 26D is forward pivoting rather than rearward pivoting as translating sleeve 24D moves forward in the thrust reverser position.

FIG. 10A is similar to FIGS. 3A, 4A, 7A, and 9A is showing the orientation of door segment 26D and the location of sections A-A and B-B. FIG. 10B shows translating sleeve 24D and door segment 26D in the forward cruise position. Sections A-A and B-B have been superimposed on the drawing of door 26D.

FIG. 10C shows door 26D after translating sleeve 24D has moved rearward to the thrust reverser position. This rearward motion has caused the translation of pivot axis P and a forward pivoting of door segment 26D to the closed position shown in FIG. 10C.

In each of the embodiments described above, wide blocker door segments are configured to pivot along a chord span between bearings set in the wall of the translating sleeve. During cruise, the door segments are flush at the inner wall of the translating sleeve, with structural hoop continuity between the bearings so that simple rotation causes the door segments to close to the core cowl for blockage. The edge of the door segment that is pivoted toward the core cowl 54 is contoured to compliment or mate with the outer contour of the core cowl and thus assures closure for blockage. The arc curvature of the door segment, when operated in an aft pivoting mode, provides parachute-like tensile loads under blocking pressure, with the loads being carried into the bearings and the translating sleeve. As these loads are almost symmetrical on the door segments, they will be almost pressure neutral, which may allow torque actuation at the bearings. Single drag links for the door segments, or other passive or active devices can be used to produce pivoting action as the translating sleeve moves rearward from the cruise to the thrust reversal position.

The pivoting blocker door thrust reverser can use a single wide pivoting blocker door segment to effectively close a full duct section between bifurcation or splitter walls when the door segment is translated and articulated from the stowed cruise position to the deployed thrust reverser position. The three-door and two-door embodiments that are described make use of a single segment to close a full duct section. Alternatively, two wide pivoting blocker door segments can be used to close one duct section, as is illustrated by the four-door configuration shown in FIGS. 8 through 10C.

The backside or outer surface of the door segments 56 may be circular shaped about the transverse bearing pivot axis P with a clearance fit with respect to the contour of the inner wall of the translating sleeve in order to minimize leakage. Similarly, the contour of the inner wall of the translating sleeve 60 may have a similar circular or arcuate shape that matches the shape of the outer surface of the door segments.

Actuation of the door segments may be achieved using a single drag link at each door so that translations of the door segment imparts in motion geometry necessary to deploy the door segments with thrust reverse. The use of a single drag link can also add stability to the pivoting door by providing a third point of connection in addition to the two bearings that define the pivot axis P.

Other torsional or shaft rotation devices may also be employed to achieve actuation and coordination of the door segments. For example, multiple doors may be serially connected by universal joint or gear transfer devices. In the case of forward pivoting doors, FIGS. 10A-10C, conventional drag links will be problematic and a more likely passive actuation system will be positioned outboard of the bypass flow stream 30. A flexible link, attached to fixed structure 22 or 52 forward and to the back of the door aft, will convert trans-sleeve motion to tangential door rotation. This may be achieved with the use of a chain link or belt device from a fixed structure forward of the doors.

In those embodiments that make use of tangent actuation, torsional or shaft rotation devices for deployment, the bypass duct of the thrust reverser can be totally without drag links. In that case, no induct flow stream devices are present to degrade available fan thrust.

In the three door embodiment, the thrust reverser can be totally pylon mounted in an O-duct integrated propulsion system.

In all of the embodiments described, the blocker door segments remain within the bypass duct in cruise and thrust reversal positions, and in all intermediate positions. The door segments do not extend outward through an opening in the nacelle, in contrast to prior art pivot door reversers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A thrust reverser comprising:
   a bypass duct defined by:
      a core cowl;
      a fan case;
      a translating sleeve coaxial with the core cowl and the fan case and being movable between a cruise position adjacent an aft portion of the fan case and a thrust reversal position spaced axially from the aft portion of the fan case, wherein the translating sleeve comprises a baffle with a cascade configured to direct gas flow outside the fan case when the translating sleeve is in the thrust reversal position; and
   a plurality of blocker door segments pivotally mounted to the translating sleeve,
      wherein each blocker door segment is pivotally connected to the translating sleeve at transverse ends by a pair of support bearings that establish a pivot axis along an arc chord of the blocker door segment, wherein the blocker door segments have leading edges and are positioned adjacent and within a respective pocket in an inner surface of an inner wall of the translating sleeve when the translating sleeve is in the cruise position, and being pivotable to a position in which the blocker door segments, including at least a portion of the leading edges, are positioned aft of the pocket and substantially block the bypass duct when the translating sleeve is in the thrust reversal position,
   wherein the blocker door segments pivot so that the segments are disposed within the translating sleeve at all positions of the translating sleeve from the cruise position to the thrust reversal position; and
   a single drag link connected to each blocker door segment and to the core cowl.

2. The thrust reverser of claim 1, wherein each blocker door segment is shaped to conform to or clear the inner wall of the translating sleeve when the translating sleeve is in the cruise position.

3. The thrust reverser of claim 2, wherein each blocker door segment has a leading edge that is shaped to conform to the inner wall of the translating sleeve and a trailing edge shaped to conform to the core cowl when the translating sleeve is in the thrust reversal position.

4. The thrust reverser of claim 1, wherein the pivot axes along the arc chords of the block door segment translate rearward as the translating door moves from the cruise position to the thrust reversal position.

5. The thrust reverser of claim 1, wherein the plurality of blocker door segments consists of two, three, or four blocker door segments.

* * * * *